United States Patent [19]

Dierssen

[11] 3,871,912
[45] Mar. 18, 1975

[54] PROCESS FOR PRODUCING A PARALLEL OVERGROWTH FOR USE AS AN EPITAXIAL THIN FILM LASER

[75] Inventor: Gunther H. Dierssen, White Bear Lake, Minn.

[73] Assignee: Minnesota Mining and Manufacturing Company, St. Paul, Minn.

[22] Filed: Apr. 2, 1973

[21] Appl. No.: 347,236

Related U.S. Application Data

[63] Continuation-in-part of Ser. No. 887,650, Dec. 23, 1969, Pat. No. 3,730,764.

[52] U.S. Cl. ............... 117/201, 23/294, 117/106 R, 330/4.3
[51] Int. Cl. ............................................. H01l 7/32
[58] Field of Search ............ 117/106 R, 106 A, 201; 23/294; 330/4.3

[56] References Cited
UNITED STATES PATENTS
3,730,764   5/1973   Dierssen ..................... 117/106 R X Primary Examiner—Leon D. Rosdol
Assistant Examiner—Harris A. Pitlick
Attorney, Agent, or Firm—Alexander, Sell, Steldt & DeLaHunt

[57] ABSTRACT

A static atmosphere process for production of laser materials. An epitaxial film of a source material is produced on a single crystalline substrate. The source material and substrate are each a compound or solid solution of the elements cadmium, sulfur, zinc, selenium and tellurium. The substrate is selected to have an optical band edge at least equal to the source material optical band edge and to have an interatomic spacing within 12 percent of the interatomic spacing of a crystal of the source material. The substrate is provided with at least one growth surface which is substantially flat and has a crystallographic orientation not corresponding to the crystallographic orientation of a naturally occurring major face of a crystal of the source material. The substrate growth surface is positioned proximate a bed of porous source material in a static atmosphere reaction chamber and the chamber is heated to a uniform predetermined temperature to promote sublimation of the source material to produce an overgrowth of the source material on the substrate growth surface.

12 Claims, 3 Drawing Figures

PATENTED MAR 18 1975

3,871,912

3,871,912

PROCESS FOR PRODUCING A PARALLEL OVERGROWTH FOR USE AS AN EPITAXIAL THIN FILM LASER

CROSS-REFERENCE TO RELATED CASE

This is a continuation-in-part of my copending application entitled PROCESS FOR PRODUCING A PARALLEL OVERGROWTH FOR USE AS AN EPITAXIAL THIN FILM LASER, Ser. No. 887,650, filed Dec. 23, 1969 and now U.S. Pat. No. 3,730,764.

BACKGROUND OF THE INVENTION

Since at least the mid-1960's, attempts have been made to construct two-dimensionally "scannable" laser devices. In a scannable laser device, a source of excitation energy, most commonly an electron beam having a relatively small cross-sectional area, is impinged upon and penetrates a first surface of a laser material. This first surface together with an opposite second surface form a resonant cavity and when laser emission is produced, it exits or is emitted from the second surface at a point opposite the point at which the electron beam impinged. By scanning the beam of excitation energy across the first surface, the resulting emission from the second surface is scanned in a corresponding manner.

The earliest reported scannable lasers employed materials which were either "wafers" or "platelets." Wafers are slices of material cut from bulk crystals. The surfaces formed by cutting (the "cut" surfaces) are ground and polished to an appropriate smoothness and parallelity to form the aforementioned first and second cavity surfaces. A platelet is a crystal which grows as a thin slice of material having natural surfaces which in some instances are sufficiently smooth and plano-parallel to form cavity surfaces.

The useable emission from a particular laser material is generally composed of a single or relatively few wavelengths. For semi-conductor laser materials the emission is generally referred to as band edge emission which means that a major proportion of the light is emitted in a narrow band just below the optical band edge of the material. The elemental composition of a material determines the wavelength of its "band." The bands of the different compositions of the series of compounds and solid solutions of the elements of the present invention collectively extend over an entire range of wavelengths. The extremes of the range are the bands of zinc sulfide and cadmium telluride. Each multi-composition material (ternary or more complex compositions), and each other binary compound of the series has a band lying between these extremes. The series is generally defined as: $Zn_xCd_{1-x}S_ySe_zTe_{1-y-z}$, wherein each of $x$ and $(y+z)$ may have values between 0 and 1.

SUMMARY OF THE INVENTION

The present invention provides a practical method of producing laser materials which will lase at a particular preferred wavelength. According to the process of my invention, it is possible to repeatedly reproduce multicomposition overgrowths. Large surface area epitaxial thin films useful as laser materials can be produced by a vapor deposition process wherein single crystal substrate materials and source materials selected from the group consisting of compounds and solid solutions of Group IIb–VIa elements are placed within a static reaction chamber and the chamber is heated to a uniform predetermined temperature sufficient to cause sublimation of the source material and production of an epitaxial thin film of the source material on the substrate.

In the process of the present invention, the static reaction chamber may be provided within a vacuum tight enclosure, or the enclosure may itself form the reaction chamber. Where a separate chamber is provided, direct flow of vapors between the enclosure and the chamber is prevented, while yet allowing diffusion of vapors between the enclosure and the chamber to equilibrate the atmospheres therebetween.

A bed of a predetermined quantity of powder of the source material is positioned within the reaction chamber, and the substrate material is positioned on an inert spacer and preferably above the bed. The chamber is heated to the desired reaction temperature which is uniform across the reaction chamber, and sufficient to enable sublimation of the source material and deposition thereof on the substantially flat growth surface.

The invention is particularly directed to producing such films on substrates wherein combinations of single crystalline substrate materials and source materials are compounds or solid solutions of at least one of the elements selected from the group consisting of sulfur, selenium and tellurium, wherein crystals of both materials have an interatomic spacing mismatch along at least one crystallographic axis of less than 12 percent, wherein the single crystalline substrate has at least one substantially flat growth surface crystallographically oriented so as to not correspond with a naturally occurring major face of crystal of the source material, and wherein the substrate has an optical band edge at least equal to the optical band edge of the source material.

Preferably, to provide a growth rate between practical and acceptable limits, the temperature of the source material is maintained at a temperature corresponding to a vapor pressure of at least one of the source material elements within a range from 0.1 to 10.0 Torr.

The qualitative test of a substantially flat substrate surface is that the lattice of the desired crystallographic orientation be exposed nearly everywhere on the surface so that a continuous overgrowth will be produced.

A preferred substrate may be a cut wafer. Such a wafer may be prepared from a larger bulk single crystal by the following general procedures: mounting the crystal on a cutting support by use of a thermoplastic adhesive such as bees-wax; cutting the crystal into wafers of an appropriate thickness; and etching the surface to expose nearly everywhere an ordered surface. Grinding and polishing the cut surfaces to be flat and plano-parallel prior to etching by using conventional surface grinding technology is also desired. For example, flat surfaces which produce fewer than twenty and preferably fewer than ten fringes per millimeter when compared against an optical flat using interferrometric techniques and green light are preferred. Preferably the surfaces upon which the film is to be grown are exposed to a very gentle surface etch, using an etchant such as either a dilute acid or a vapor etchant. One such vapor etchant is gaseous hydrogen. The vapor etch is preferably performed immediately before beginning the growth process, although this step can also be performed during the first few minutes of the vapor growth process.

Once the film is grown, the outer surfaces of the film-wafer composite are polished and etched to a desired thickness to form a pair of plano-parallel surfaces suitable for use as a Fabry-Perot optically resonant cavity. Such a cavity is conviently formed by reflectorizing the planoparallel surfaces.

Table I below sets forth source and substrate combinations of binary compounds satisfying the aforedescribed interatomic spacing mismatch and optical band edge requirements.

Table I

| Source | Substrate(s) | Mismatch |
|---|---|---|
| ZnS | ZnS | 0.0% |
| CdS | ZnS | −7.2% |
|  | CdS | 0.0% |
|  | ZnSe | −2.8% |
| ZnSe | ZnS | −4.5% |
|  | ZnSe | 0.0% |
| CdSe | ZnS | −10.7% |
|  | CdS | −3.8% |
|  | ZnSe | −6.5% |
|  | CdSe | 0.0% |
|  | ZnTe | +.8% |
| ZnTe | ZnS | −11.4% |
|  | CdS | −4.5% |
|  | ZnSe | −7.2% |
|  | ZnTe | 0.0% |
| CdTe | CdS | −10.0% |
|  | CdSe | −6.4% |
|  | ZnTe | −5.7% |
|  | CdTe | 0.0% |

Mismatch was calculated for Table I using the formula:

Mismatch=$(L_1 - L_2 \times 100)/L_2$% wherein: $L_1$ and $L_2$ are the interatomic spacings of the substrate and source materials respectively.

The interatomic spacing and optical band edges of the compounds of Table I are set forth below in Table II.

Table II

|  | ZnS | CdS | ZnSe | CdSe | ZnTe | CdTe |
|---|---|---|---|---|---|---|
| Interatomic Spacing (A) | 2.34 | 2.52 | 2.45 | 2.62 | 2.64 | 2.80 |
| Band Edge (e.v.) | 3.65 | 2.415 | 2.71 | 1.74 | 2.32 | 1.54 |

By naturally occurring major face, is meant a face produced in preference to, although not to the exclusion of, other faces when high purity, undoped source materials are employed under growth conditions approximating those of nature, i.e., slow, near equilibrium growth conditions. Examples of naturally occurring major faces of hexagonal type materials such as CdS, CdSe, solid solutions thereof and ZnS, formed through static atmosphere crystal growth experiments and as determined by X-ray crystallographic investigation, are the basal planes (0001) and (000$\bar{1}$); the first order prismatic planes, (1$\bar{1}$00) (01$\bar{1}$0) (10$\bar{1}$0) ($\bar{1}$010) ($\bar{1}$100) (0$\bar{1}$10); and the second order prismatic planes ($\bar{1}$2$\bar{1}$0) ($\bar{1}$$\bar{1}$20) (2$\bar{1}$$\bar{1}$0) (1$\bar{2}$10) (11$\bar{2}$0) ($\bar{2}$110). By a like manner of determination, octahedral planes (111) (11$\bar{1}$) ($\bar{1}$11) ($\bar{1}$$\bar{1}$1) (1$\bar{1}$1) ($\bar{1}$$\bar{1}$$\bar{1}$) (1$\bar{1}$$\bar{1}$) and (1$\bar{1}$$\bar{1}$) are known to have been found to be naturally occurring faces for cubic compounds such as ZnSe, ZnTe, and CdTe. The crystallographic orientations of the octahedral planes of a cubic crystal correspond to the crystallographic orientations of the basal planes of a hexogonal crystal. E.g., the (111) planes of a cubic crystal structurally correspond to the basal (0001) planes of a hexagonal crystal.

BRIEF DESCRIPTION OF THE DRAWING

Referring now to FIG. 1, a sectional view of a furnance 10 and a vacuum tight enclosure 12 which passes therethrough is shown. The vacuum tight enclosure 12 comprises a fused-silica tube 11 within a mullite tube 14 having removable end seals 16A and 16B having ports 18A and 18B respectively. End seal 16A has an additional opening through which a fused silica tube 20 may be inserted. The tube 20 also has a port 22.

According to one process of the present invention, ports 18A, 18B and 22 are sealed and the sealed tube 14 then forms a static reaction chamber. The source material and substrate are placed within tube 14 and the ambient temperature within the tube raised to the desired reaction temperature.

Figure 1:
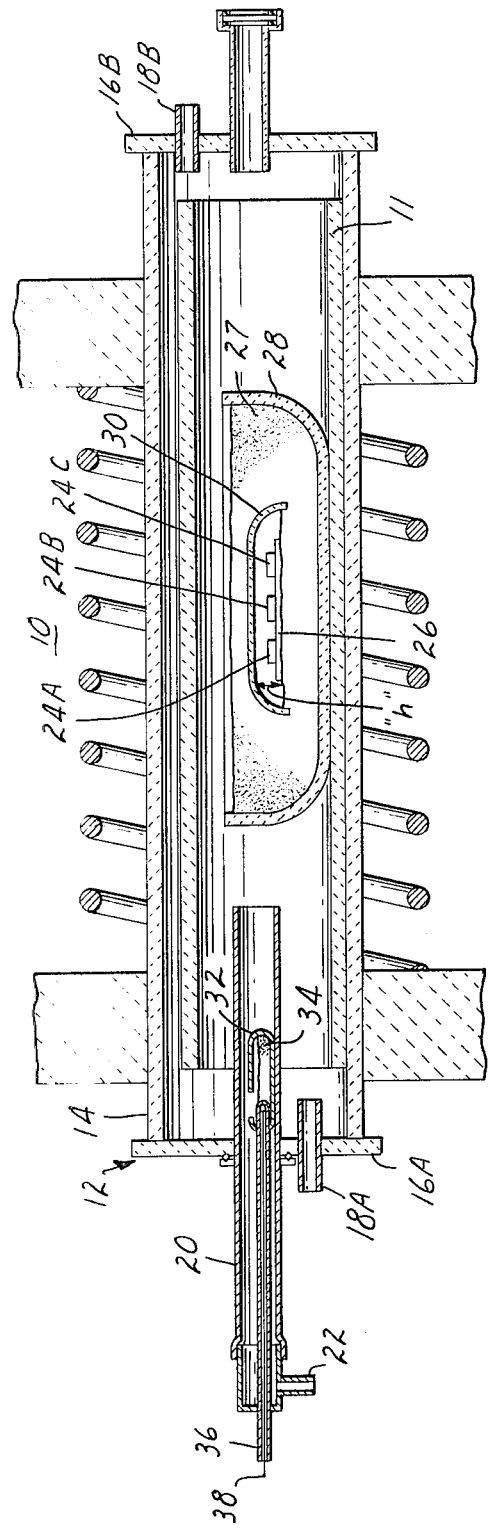
FIG. 1 shows a sectional view of a growth system suitable for carrying out the growth steps of the present process.

In another process, the static reaction chamber is formed by inverting a container over the substrate. This is shown in FIG. 1, wherein crystal substrates 24A, B and C rest on an inert spacer 26 which in turn rests on a porous bed of sinter powder source material 27 in a fused silica boat 28. A container 30 is inverted over the substrates and spacers with at least the rim of the container below the surface of the sinter powder. Although it need not be, the container 30 may be completely submerged in the sinter powder. A space having a vertical dimension, indicated in FIG. 1 by the character "h," of from about one-fourth inch (0.5 cm.) to about 2 inches (5 cm.) and preferably of about 1 inch (3 cm.) provides the reaction chamber. Preferably the exposed surface area of the porous bed is approximately equal to the total surface area of the substrate growth surfaces. Container 30 may be impervious or slightly porous. Port 22 is sealed. Either port 18A or 18B is connected to a source of an inert gas, e.g., argon; the other port serves as an outlet port. Before any substantial heating of the source material, a slow flow of the inert gas (from 10 to 100 cubic centimeters per minute) is maintained through the tube for a time sufficient for the gas to filter, i.e., diffuse, through the porous bed of source material and enter and fill the static reaction chamber. The enclosure may also be evacuated and back flushed with inert gas.

In a further process of the present invention, a vapor of one constituent (an element) of the source material is introduced into a vacuum tight enclosure at a temperature corresponding to a vapor pressure of the constituent of from 0.1 to 10 Torr. Vapors of the constituent disperse throughout the enclosure and enter and diffuse into the static reaction chamber to control the stoichiometry of the overgrowth. In FIG. 1, a boat 32 is shown to contain a constituent 34. A push rod 36 is provided for moving boat 32 into and out of the furnace for positioning the boat 32. During the growth process the boat 32 is positioned in a region of the furnace at a temperature corresponding to a vapor pressure of the constituent of from 0.1 to 10 Torr. Vapors of the constituent disperse through the enclosure and enter and diffuse into the reaction chamber through passageways normally existing in the porous bed to control the stoichiometry of the parallel overgrowth. A thermocouple 38 is provided for monitoring the temperature of the constituent element. The source of inert gas previously referred to would be connected to port 22 and port 18A would be sealed.

In each of the foregoing processes, a slow flow of an inert gas may be passed through the vacuum tight enclosure at about atmospheric pressure during the growth process. Even in those cases where the vacuum tight enclosure is not itself the static reaction chamber, the passageways in the bed of porous source material result in the reaction chamber being maintained at about atmospheric pressure.

Figure 3:
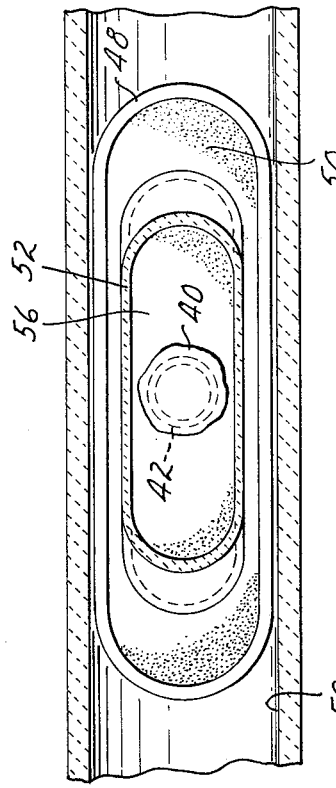
FIG. 3 shows a top view of the interior of the growth system of FIG. 2 taken along lines 3—3.
Figure 2:
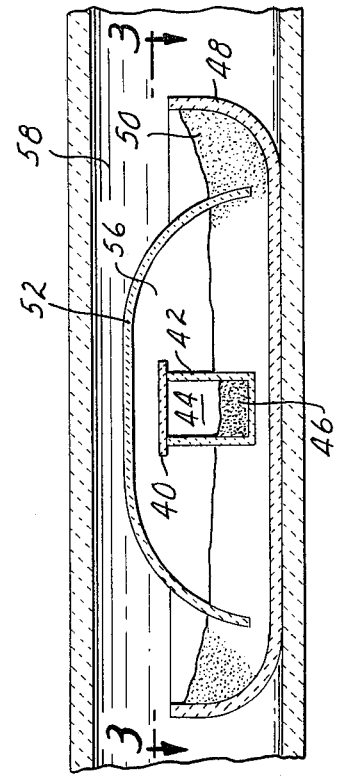
FIG. 2 shows a sectional view of another embodiment of a growth system suitable for carrying out the present invention.

FIGS. 2 and 3 show another growth system where the static reaction chamber 44 is formed by placing the crystal substrates 40 on top of an inert crucible 42 which spaces the substrate 40 above a bed of fine powder source material 46 placed within the crucible 42, which in turn is placed in a fused silica boat 48. Vaporization of the outer substrate surfaces is prevented by surrounding the crucible 42, partially filling the silica boat 48 with another bed of sinter powder 50, and by placing an inverted container 52 over the crucible 42, having the edges buried below sinter powder 50, thereby forming a second chamber 56. The sinter powder 50 is of the same composition as that of the substrate 40, and vaporizes during the growth process to establish an equilibrium vapor pressure of the vapors of the substrate material to prevent vaporization of the single crystalline substrate material. Deposition of the vapors onto the outer surfaces will desirably result. This assembly is then inserted into the center zone 58 of an evacuatable enclosure within a furnace as described hereinabove with reference to FIG. 1.

It is to be understood that all materials and apparatus used in carrying out the present invention, except the source, substrate and constituent materials, are chemically inert, i.e., they do not enter into the reaction which produces the parallel overgrowth. Having thus described the general features of my invention, specific examples will now be discussed.

EXAMPLE 1

Crystals from a batch of cadmium sulfide crystals are placed on a CdS crystal spacer which rests upon a bed of sintered powder particles having an average diameter of less than one micrometer and having a composition of $CdS_{0.8}Se_{0.2}$. The substrate growth surface is desirably substantially horizontal. A container in the form of a fused silica boat placed in inverted position over the selected crystals and crystal spacers provides a static reaction chamber above and around the exposed surfaces of the selected crystals. Additional sinter powder of the source material is added to seal the static reaction chamber except for passageways normally existing through the sinter powder. The dimension $h$ is about 1 inch.

The growth is carried out in a vacuum tight enclosure adapted for argon flow therethrough such as that shown in FIG. 1. Tube 11 is a 2¼ inch (5.72 cm.) outside diameter circular fused silica tube about 56 inches (140 cm.) long, and tube 14 is a 2½ inch (6.35 cm.) inside diameter circular mullite tube about 60 inches (150 cm.) long. Boat 28 is a half section of a circular fused silica tube with the ends turned up. Container 30 is a similarly formed fused silica tube. The ends of the tube at which the argon enters and exits are near room temperature. The boat containing the platelets is placed in the "exit" end of the mullite tube system (the end from which the argon exits) and held in a slow argon flow (about 50 cc. per minute) for not less than 10 minutes to provide an opportunity for the argon to filter through the sintered powder particles and enter and fill the cavity formed by the inverted boat. The boat is then pushed into a zone of the system at which the temperature is uniform across the reaction chamber. The temperature of that zone is maintained at about 1,050°C for about 20 minutes and then the temperature of the zone is rapidly reduced (over about 1–2 minutes) to about 990°C. Then, the zone temperature is again reduced to about 900°C, this time relatively slowly (over a period of about 90 minutes). The boat is then pulled into the exit end of the system for approximately 20 minutes to cool the crystals.

An orange-colored thin-film is thus formed on what had been the top growth surface of the crystal substrate. The film-substrate combination surfaces are then polished to obtain a desired thickness and planoparallelity.

After ensuring that the film-substrate combination is plano-parallel, the surfaces are provided with mirrors. A dielectric mirror deposited by vapor deposition on a glass slide and secured to the "bottom" crystal surface using a thermosetting adhesive varnish (GE 7031 Varnish) provides one mirrored surface. The exposed surface of the cadmium sulfide selenide overgrowth is coated by well-known evaporation techniques with a layer of silver about 0.15 micrometers thick. This structure is next mounted in thermal contact with a copper cold finger of a cryostat filled with liquid nitrogen in a manner to permit bombarding of the silvered surface of the overgrowth with an electron beam. When the silvered surface of the overgrowth is bombarded, light is emitted through the dielectric mirror, collected, and analyzed external to the cryostat using a conventional monochrometer grating and plotting device. The bombarding beam is preferably a pulsed electron beam having a current density which varies from zero to about 10 amps/cm.$^2$ at an energy of 45 KeV. As the current density is increased, the intensity of the emitted light becomes superlinear in relation to the current density and the emission becomes directional, thus indicating the onset of laser emission.

EXAMPLE 2

Another group of five cadmium sulfide crystals is selected as described in Example 1. The crystals are placed on a MgO spacer on a bed of sintered powder particles of $CdS_{0.8}Se_{0.2}$ such as those described in Example 1. A static reaction chamber is formed and the cavity thereof filled with argon gas as described in Example 1. Films are grown on the crystals according to the following process.

The boat containing the sintered powder particles is positioned in a zone of the tube system at which the temperature is 950°C. This temperature is maintained for about 18 hours during which time a slow flow of argon (about 100 cubic centimeters per minute) is maintained through the enclosure 12. The cooling step of Example 1 is followed. An orange-colored thin-film is thereby grown on the "top" surface of the substrate, and thinner deposits varying in thickness are grown on the "bottom" substrate surface. The outer surfaces are then polished to obtain a desired thickness and planoparallelity.

The top and bottom surfaces of the film substrate combination are provided with silver mirrors, mounted, cooled, and the silvered growth surface bombarded as described in Example 1. Laser emission is thereby produced.

EXAMPLE 3

Substrates are selected from a batch of cadmium sulfide crystals as described in Example 1. A bed of source material and a static reaction chamber is provided like that described in Example 1.

The growth is carried out by placing the boat containing the crystals in the exit end of the enclosure 12 and holding it there in a slow argon flow (about 100 cubic centimeters per minute) for approximately 30 minutes. The boat is then pushed into a zone of the system at which the temperature is uniform across the reaction chamber. The temperature of that zone is maintained at about 980°C for 20 minutes. About 15 minutes into that period, a small fused silica boat containing about 10 grams of selenium metal which previously has been positioned in the "entrance" end of enclosure 12 (the end from which the argon enters) is moved towards the center of the furnace to a region at which the temperature of the selenium metal is approximately 430°C. For the remainder of the growth process, movement of the selenium boat is made as required to maintain the boat temperature at about 430°C.

After the substrates are exposed to a temperature of 980°C for the aforementioned 20 minute period, the temperature of the furnace is dropped very rapidly (over a period of about 10 minutes) to 910°C. Thereafter, a 50°C per hour temperature drop is continued for about 2 hours. When the temperature reaches about 830°C, the selenium boat is withdrawn to the entrance end of enclosure 12 into a region at about room temperature. About 15 minutes later, at approximately the end of the 2 hour period, when the temperature of the furnace in the region of boat 28 drops to 810°C, the boat 28 is pulled into the exit end of enclosure 12 into a region also at about room temperature. The boat 28 is left to cool in this region for about 20 minutes after which it is removed from enclosure 12. After removal from the oven a dark, red colored film is observed to have formed on both the top and bottom substrate surfaces.

The dark color is indicative of the higher concentration of selenium than in Examples 1 and 2. The surfaces are then polished to obtain a desired thickness and planoparallelity.

The aforedescribed polished film-substrate combination is coated on its top and bottom surfaces by vacuum evaporation techniques with silver mirrors about 1,550 A thick on the top side and about 525 A thick (semi-transparent to the emission of the parallel overgrowth) on the bottom side. The semi-transparent mirrored surface is attached with a thin layer of the thermosetting varnish to a sapphire cryostat window slab which in turn is mounted in thermal contact with a cold finger of a cryostat filled with liquid nitrogen. When the sample is bombarded on the surface coated to a thickness of 1,550 A with an electron beam as described in Example 1, laser emission is produced, wherein the emission occurs at a longer wavelength, characteristic of the higher concentration of selenium in the film.

EXAMPLE 4

A large single crystal of cadmium sulfide was sliced into wafers approximately 1 mm thick. The crystal was intentionally mounted so that the "C"-axis, as evidenced by external striations on the crystal, was at a random angle off of the cutting axis. The wafers were etched for 1 minute in 24% HCl, washed and re-etched again as before. These wafers were used as substrates, upon which film deposits were produced using the system of FIGS. 2 and 3 in the following manner: A wafer 40 was placed on top of a 16 mm inside diameter high purity aluminum oxide crucible 42, thereby forming a static reaction chamber 44, into which there had been placed 1.5 grams of a 1:1 weight mixture of cadmium sulfide and cadmium selenide powders 46 having a diameter of not greater than about ten micrometers. The crucible 42 and wafer 40 was placed in a large fused silica boat 48 and surrounded with a bed of relatively coarse cadmium sulfide sinter powder 50, having an average diameter of not less than 50 micrometers. A second fused silica boat 52 was placed in an inverted position over the crucible 42 and additional cadmium sulfide sinter powder was placed around the edges such that the walls of the fused silica boat 52 extended into the sinter powder bed 50. The assembly was introduced into the center zone of a tube furnace 56 at which the temperature would be uniform across the reaction chamber, sealed and evacuated as in Example 1. The furnace was heated to 500°C and back flushed with argon. A three cycle heating program was then initiated, in which the furnace was heated to 1,050°C, cooled to 900°C, reheated to 1,050°C, cooled to 900°C, reheated to 1,050°C, and again cooled to 900°C, the entire program taking 20 hours. The crucible was then moved to a cool portion of the furnace for approximately 20 minutes and allowed to cool to room temperature, after which the wafers were removed. A striated, rough faceted film of red $CdS_{0.7}Se_{0.3}$, 16 mm in diameter, was present on the CdS wafer surface turned toward the powders 46. The $CdS_{0.7}Se_{0.3}$ film varied in thickness, ranging from a minimum thickness of 50 micrometers to a maximum thickness of about 120 micrometers. Newly formed faceted striations on the other major surface indicated that some CdS growth on that surface had occurred. A gain in weight of approximately 0.1 grams was obtained during the growth process.

The film surface was then polished to a uniform thickness of approximately 50 micrometers after which the opposite surface of the crystal was polished flat and parallel to the film surface to within one interferometric fringe as measured on a Zeiss-Fizeau type interferometer. The polished film substrate combination was then finally treated with a combined chemical and mechanical polishing technique.

Mirrored surfaces were applied to the exposed surfaces of the film substrate combination by the vacuum vapor deposition of silver layers about 500 A thick on the cadmium sulfide wafer side and about 1,500 A thick on the $CdS_{0.7}Se_{0.3}$ film side. The resultant cavity was cooled to 77°K and bombarded on the mirrored film surface by a pulsed electron beam having a dwell time of approximately 50 nanoseconds, focused to approximately 100 micrometers diameter, and accelerated to a potential of 40 KeV. A threshold for the onset of laser emission as evidenced by the sudden occurrence of directionality in the output light beam was noted when the electron beam current was raised to 2.0 mA.

The wafer surface was subsequently polished down to achieve a new film substrate combination thickness of about 100 micrometers. After remirroring the wafer surface, the combination had a laser emission threshold at 77°K of about 0.4 mA under the same conditions noted above. A peak power output of 1.5 watts was observed using a beam current of about 4.5 mA. The laser emission was quite polarized and occurred at a wavelength centered at about 5,750 A.

Having thus described the invention in relationship to the preferred embodiment, what is claimed is:

1. A vapor deposition process for the production of an epitaxial thin-film on a single crystalline substrate, wherein the resultant thin-film-substrate combination, when formed into a resonant cavity, is capable of laser emission, said process comprising the steps of:
   a. selecting a combination of a single crystalline substrate material and source material wherein both said materials are compounds or solid solutions of at least one of the elements selected from the group consisting of cadmium and zinc, together with at least one of the elements selected from the group consisting of sulfur, selenium and tellurium, wherein crystals of both said materials have an interatomic spacing mismatch along at least one crystallographic axis of less than 12 percent, wherein said single crystalline substrate has at least one substantially flat growth surface crystallographically oriented so as not to correspond with a naturally occurring major face of a crystal of said source material and wherein said substrate has an optical band edge at least equal to the source material optical band edge;
   b. providing a vacuum tight enclosure as a static reaction chamber;
   c. positioning within said reaction chamber a bed of a predetermined quantity of sinter powder of said source material;
   d. positioning said substrate on an inert spacer block and above said bed; and
   e. heating said reaction chamber to a uniform predetermined temperature sufficient to enable sublimation of said source material and continuing heating to produce said epitaxial thin-film of said source material on said substantially flat growth surface.

2. A process according to claim 1 wherein said selecting step comprises selecting as a substrate a material having major surfaces parallel to within ten fringes per millimeter when viewed with an interference microscope using green light.

3. A process according to claim 1 further comprising introducing into said vacuum tight enclosure a constituent element of said source material and heating said element to a temperature corresponding to a vapor pressure of said element of from 0.1 to 10 Torr, whereby vapors of said element disperse throughout said enclosure and diffuse into said reaction chamber to control the stoichiometry of said epitaxial thin-film.

4. A vapor deposition process for the production of an epitaxial thin-film on a single crystalline substrate, wherein the resultant thin-film-substrate combination, when formed into a resonant cavity, is capable of laser emission, said process comprising the steps of:
   a. selecting a combination of a single crystalline substrate material and source material wherein both said materials are compounds or solid solutions of at least one of the elements selected from the group consisting of cadmium and zinc, together with at least one of the elements selected from the group consisting of sulfur, selenium and tellurium, wherein crystals of both said materials have an interatomic spacing mismatch along at least one crystallographic axis of less than 12 percent, wherein said single crystalline substrate has at least one substantially flat growth surface crystallographically oriented so as not to correspond with a naturally occurring major face of a crystal of said source material and wherein said substrate has an optical band edge at least equal to the source material optical band edge;
   b. providing within a vacuum tight enclosure a porous bed of a predetermined quantity of sinter powders of said source material;
   c. positioning said substrate material on an inert spacer block and above said porous bed;
   d. forming a static reaction chamber containing at least a portion of the substrate and a portion of the source material wherein the direct flow of vapors between the enclosure and the reaction chamber is prevented and wherein the diffusion of vapors between the enclosure and the reaction chamber is allowed; and
   e. heating said reaction chamber to a uniform predetermined temperature sufficient to enable sublimation of said source material, and continuing heating to produce said epitaxial thin-film of said source material on said substantially flat growth surface.

5. A process according to claim 4 wherein the step of forming the static reaction chamber comprises covering said positioned substrate material with an inverted container to form a static reaction chamber between said inverted container and said substrate material, wherein the walls of said inverted container extend into said porous bed to prevent said direct flow of vapor and to allow said vapor diffusion.

6. A process according to claim 5 wherein said inverted container comprises a non-porous material and wherein said step of positioning said inverted container further comprises adding additional source material such that said inverted container is completely covered by sinter powders of said source material, thereby further restricting said diffusion path of vapors between said reaction chamber and said enclosure.

7. A process according to claim 6 further comprising the step of flowing an inert gas through said enclosure at a rate of less than 100 cubic centimeters per minute, wherein said inert gas diffuses through said porous bed into said reaction chamber, thereby displacing gasses initially present and thereafter providing an inert atmosphere within said chamber at about atmospheric pressure wherein vapors of said source material are transported and deposited as a said single crystalline epitaxial film of said source material on said substantially flat growth surface.

8. A process according to claim 7 wherein the selecting step comprises selecting as a substrate material, a single crystal of cadmium sulfide, and selecting as a source material, a sinter powder having an average diameter of less than one micrometer and having a composition of $CdS_{0.8}Se_{0.2}$; and wherein said heating step comprises positioning said reaction chamber in a zone at which the temperature is uniform across said reaction chamber and maintaining said zone temperature at about 1,050°C for about 20 minutes, rapidly reducing the zone temperature to about 990°C in less than 2 minutes and thereafter slowly reducing the temperature over a period of about 90 minutes to about 900°C, thereafter moving said bed into a cool portion of the enclosure adjacent a port allowing gasses to exit the enclosure, and allowing said bed to cool for approximately 20 minutes before removal from the enclosure.

9. A process according to claim 7
wherein the selecting step comprises selecting as a substrate material, a single crystal of cadmium sulfide, and selecting as a source material, a sinter powder having an average diameter of less than one micrometer and having a composition of $CdS_{0.8}Se_{0.2}$; and wherein the heating step comprises positioning said reaction chamber in a zone at which the temperature is uniform across said reaction chamber and maintaining said zone temperature at 950°C for about 18 hours, thereafter moving said bed into a cool portion of the enclosure adjacent a port allowing gasses to exit the enclosure and allowing said bed to cool for approximately 20 minutes before removal from the enclosure.

10. A process according to claim 7 further comprising positioning within said enclosure a source of selenium;

wherein the selecting step comprises selecting as a substrate material, a single crystal of cadmium sulfide, and selecting as a source material, a sinter powder having an average diameter of less than one micrometer and having a composition of $CdS_{0.8}Se_{0.2}$; and wherein the heating step comprises positioning said reaction chamber in a zone at which the temperature is uniform across said reaction chamber and maintaining the temperature of the zone at about 980°C for 20 minutes, moving the selenium metal source into a region wherein the temperature is approximately 430°C after said bed has been held at 980°C for about 15 minutes and maintaining the selenium source at about 430°C for the remainder of the growth process, after said 20 minute period reducing said zone temperature to 910°C over a period of about 10 minutes, thereafter reducing said zone temperature at 50°C per hour for about 2 hours, meanwhile removing the selenium metal source into a region of said enclosure at about room temperature when said zone temperature reaches about 830°C, and after said bed cools to 810°C, moving said bed into a cool portion of said enclosure adjacent a port allowing gasses to exit the enclosure and allowing said bed to cool for approximately 20 minutes before removal from the enclosure.

11. A process according to claim 4, further comprising
surrounding said reaction chamber with a bed of porous sinter powder of the same composition as that of the substrate material and covering the reaction chamber with an inverted container wherein the walls of the container extend into the bed of porous sinter powder of the same composition to form a second chamber within which an equilibrium vapor pressure of vapors of the substrate material may be established to prevent vaporization of the single crystalline substrate material.

12. A process according to claim 11, wherein the selecting step comprises selecting as a substrate material a single crystal of cadmium sulfide, and selecting as a source material, a sinter powder having a diameter of not greater than about 10 micrometers and having a composition of $CdS_xSe_{1-x}$, where $x$ is between 0 and 1, and wherein said heating step comprises positioning said reaction chamber in a zone at which the temperature is uniform across the reaction chamber and heating the zone temperature to about 1,050°C, thereafter three times slowly cycling the zone temperature between about 900°C, and about 1,050°C over a period of about 20 hours, thereafter moving said bed into a cool portion of the enclosure and allowing said bed to cool for approximately 20 minutes before removal from the enclosure.

* * * * *